(12) United States Patent
Lococo et al.

(10) Patent No.: US 8,379,766 B2
(45) Date of Patent: Feb. 19, 2013

(54) MULTI-CHANNEL RECEIVER

(75) Inventors: Luca Lococo, Anisy (FR); Olivier Jamin, Sainte Honorine due Fay (FR)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 13/419,998

(22) Filed: Mar. 14, 2012

(65) Prior Publication Data

US 2012/0170686 A1 Jul. 5, 2012

Related U.S. Application Data

(63) Continuation of application No. 13/059,167, filed as application No. PCT/IB2009/053639 on Aug. 18, 2009.

(30) Foreign Application Priority Data

Aug. 18, 2008 (EP) .................................... 08290775

(51) Int. Cl.
*H03K 9/00* (2006.01)
*H04L 27/00* (2006.01)

(52) U.S. Cl. ...................................................... 375/316

(58) Field of Classification Search .................. 375/144, 375/150, 279, 295, 316, 340, 343, 346, 349, 375/350; 455/91, 127.5, 130, 142, 144, 522
See application file for complete search history.

(56) References Cited

U.S. PATENT DOCUMENTS

| | | | | |
|---|---|---|---|---|
| 3,634,688 A | * | 1/1972 | Di Rocco | 250/366 |
| 6,256,358 B1 | * | 7/2001 | Whikehart et al. | 375/316 |
| 7,526,052 B2 | * | 4/2009 | Davidoff et al. | 375/350 |
| 2002/0193090 A1 | * | 12/2002 | Sugar et al. | 455/343 |
| 2004/0038650 A1 | | 2/2004 | Yang | |
| 2004/0038652 A1 | * | 2/2004 | Khlat et al. | 455/130 |
| 2007/0242158 A1 | * | 10/2007 | Pugel | 348/554 |
| 2008/0018427 A1 | * | 1/2008 | Ezra et al. | 340/7.32 |
| 2008/0248768 A1 | * | 10/2008 | Doi et al. | 455/127.5 |
| 2008/0318534 A1 | * | 12/2008 | Mak et al. | 455/91 |

FOREIGN PATENT DOCUMENTS

| | | |
|---|---|---|
| WO | 2005/125025 A1 | 12/2005 |
| WO | 2008/011447 A2 | 1/2008 |

OTHER PUBLICATIONS

"MT2170 Single-Chip DOCSIS 3.0 Wideband Tuner" product brief, No. MT2170 PB-00144—Rev. 1.0, 2 pgs. (Mar. 2007).
International Search Report & Written Opinion for Int'l Patent Application No. PCT/IB2009/053639 (Dec. 21, 2009).

* cited by examiner

*Primary Examiner* — David C. Payne
*Assistant Examiner* — Syed Haider (57) ABSTRACT

This invention relates to a method, a computer program product, a device, and a system, wherein a receiver unit is configured to operate in a single-channel mode and in a multi-channel mode, wherein in the single-channel mode the receiver unit is configured to output exactly one channel of a received signal, and in the multiple-channel mode the receiver unit is configured to output at least two channels of the received signal.

11 Claims, 6 Drawing Sheets

MULTI-CHANNEL RECEIVER

This application is a continuation of copending application Ser. No. 13/059,167, having a date under 35 U.S.C. §371(c) of May 6, 2011, which is the national stage of international patent application no. PCT/IB2009/053639, filed on Aug. 18, 2009, which claims priority to European patent application no. 08290775.9, filed on Aug. 18, 2008, the contents of which are incorporated by reference herein.

FIELD OF THE INVENTION

This invention relates to a method, a computer program product, a device, and a system for multi-channel reception.

BACKGROUND OF THE INVENTION

Many systems need multi-channel receivers. For example, *Data Over Cable Service Interface Specification* (DOCSIS) system introduces in the DOCSIS 3.0 specification the concept of bonding several physical channels in order to provide higher data rates. This channel bonding represents a technique for logically combining multiple DOCSIS channels, wherein in DOCSIS 3.0 four channels are bonded.

Figure 1A:
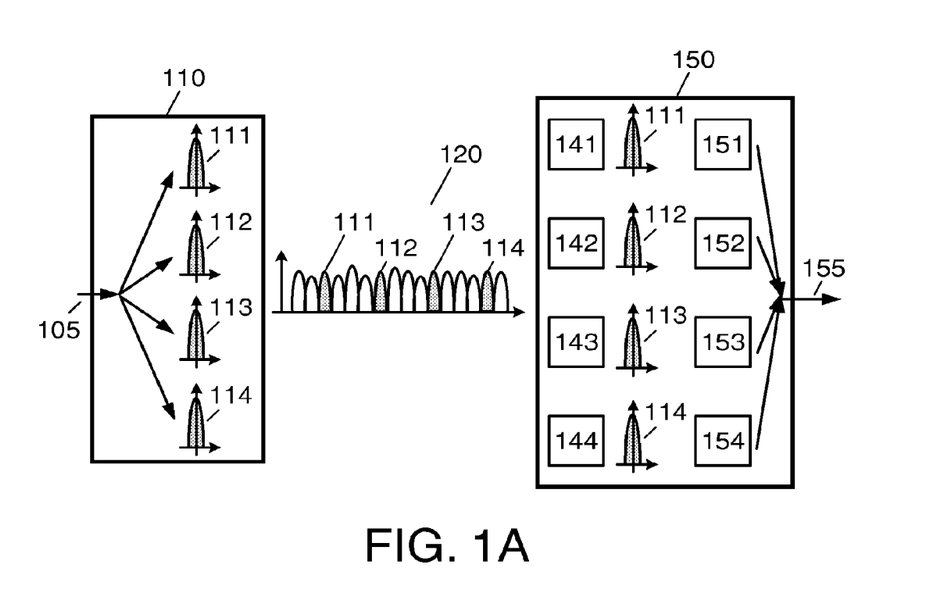
FIG. 1a a schematic block diagram of a state of the art multi-channel system according.

As can be seen in FIG. 1a, data 105 may be split between several Radio Frequency (RF) channels 111, 112, 113, 114 at the transmitter (TX) 110, wherein each channel is modulated on an own carrier frequency in the frequency spectrum 120. Furthermore, for instance, several other signals may be transmitted via separate channels in the spectrum 120.

In the receiver (RX) 150, the multiple channels 111, 112, 113, 114 are received by means of separate single channel tuners 141, 142, 143, and the data transmitted via the multiple channels 111, 112, 113, 114 is recombined after being processed by backend units 151, 152, 153, 154. Thus, the data rate can be increased without changing the existing infrastructure, i.e. with respect to DOCSIS, the existing cable can be used.

The system partitioning depicted in FIG. 1a shows the disadvantage that several single-channel receiver ICs 141, 142, 143, 144 are necessary in order to receive the multiple channels 111, 112, 113, 114, thereby increasing costs and power consumption.

Figure 1B:
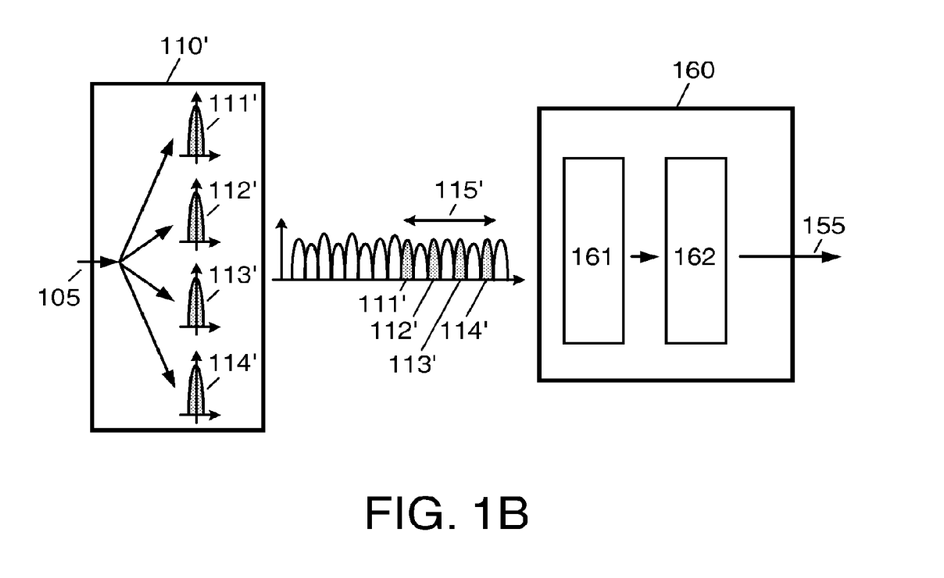
FIG. 1b a schematic block diagram of a state of the art multi-channel system according.

One more integrated solution represents the use of a wideband receiver IC 160, as exemplarily depicted in FIG. 1b. In this case, cable operators have a restriction: the 4 bonded channels are required to be located in a limited RF bandwidth. For instance, in DOCSIS 3.0 four channels 111', 112', 113', 114', transmitted from TX 110', are located in 60 MHz/100 MHz RF bandwidth 115'.

Cable is a media that is used for several application like Internet, television (TV), Voice over IP (VoIP) and others. General trend in home is to use Set-Top-Boxes for video (TV, Video on Demand, etc.) and Cable Modems for Internet and VoIP.

Therefore, DOCSIS 3.0 typical location is in the Cable Modem, and wideband receivers 160, as exemplarily depicted in FIG. 1b, are candidates for these Cable Modems. The wide band receiver 160 comprises a wideband tuner 161 and a wideband backend 162.

When wideband receivers are very well suited for Internet needs, they are also very inefficient for receiving single-channel services where low power is required. As an example, VoIP must be able to operate on battery.

SUMMARY OF THE INVENTION

According to a first aspect of the present invention, a device is described, comprising a receiver unit configured to operate in a single-channel mode and in a multi-channel mode, wherein in the single-channel mode the receiver unit is configured to output exactly one channel of a received signal, and in the multiple-channel mode the receiver unit is configured to output at least two channels of the received signal.

According to a second aspect of the present invention, a method is described, comprising determining whether a receiver unit is to be operated in a single-channel mode, wherein the receiver unit is configured to operate in the single-channel mode and in a multi-channel mode; outputting exactly one channel of a received signal at the receiver unit when the receiver unit is operated in the single-channel mode; and outputting at least two channels of the received signal at the receiver unit when the receiver unit is operated in the multi-channel mode.

According to a third aspect of the present invention, a computer-readable storage medium encoded with instructions is described that, when executed by a computer, perform: determining whether a receiver unit is to be operated in a single-channel mode, wherein the receiver unit is configured to operate in the single-channel mode and in a multi-channel mode; outputting exactly one channel of a received signal at the receiver unit when the receiver unit is operated in the single-channel mode; and outputting at least two channels of the received signal at the receiver unit when the receiver unit is operated in the multi-channel mode.

According to a fourth aspect of the present invention, a computer program is described, the computer program comprising determining whether a receiver unit is to be operated in a single-channel mode, wherein the receiver unit is configured to operate in the single-channel mode and in a multi-channel mode; outputting exactly one channel of a received signal at the receiver unit when the receiver unit is operated in the single-channel mode; and outputting at least two channels of the received signal at the receiver unit when the receiver unit is operated in the multi-channel mode.

According to a fifth aspect of the present invention, a system is described, the system comprising a device as mentioned above, and a controller unit configured to switch the device into the single-channel mode and into the multi-channel mode.

For instance, this received signal may represent a radio frequency (RF) signal, wherein this RF signal may be received by means of an antenna, or it may be received by means of cable. It has to be noted, that the received signal is not limited to RF signals.

In the single-channel mode the receiver unit is configured to output exactly one channel of the received signal. Thus, in the single-channel mode the receiver unit performs single-channel reception in order to extract a desired channel from the received signal. This channel may represent a frequency channel, i.e. a channel having a predetermined frequency bandwidth and carrier frequency in the spectrum of the received signal. For instance, this exactly one channel may be associated with a single-channel service.

Of course, the received signal may comprise further channels on different carriers, but in the single-channel mode only the desired channel is extracted. But for instance, side-lobes of adjacent channels may also be outputted together with the desired exactly one channel.

In the multi-channel mode the receiver unit is configured to output at least two channels of the received signal. Thus, in the multi-channel mode the receiver unit performs multi-channel reception in order to extract the at least two channels of the received signal. Each of these at least two channels may be associated with a separate signal having a predetermined frequency bandwidth on a separate carrier in the frequency spectrum of the received signal. For instance, at least two of the least two channels may be associated with one communication service, i.e. this one communication service uses at least two separate channels and may be associated with a multi-channel service. Thus, in order to use this communication service, the receiver unit can be operated in the multi-channel mode.

For instance, it may be determined whether the single-channel mode should be used or not, and in case the single-channel mode is selected, exactly one channel of the received signal is outputted at the receiver unit in accordance with the single-channel mode. In case no single-channel mode is selected, at least two channels of the received signal are outputted at the receiver unit in accordance with the multi-channel mode.

Thus, the device can be driven in the single-channel mode when only one channel has to be extracted from the received channel. For instance, this single-channel mode may be used for any single-channel service. This single-channel mode may allow low-power consumption compared to the multi-channel mode, as the signal-processing for extracting the exactly one channel is less complex than the signal processing for extracting the at least two channels in the multi-channel mode. For instance, the bandwidth of the exactly one channel in the single-channel mode is less then the bandwidth for processing the at least two channels in the multi-channel mode. Thus, as an example, the single-channel mode may represent a narrow-band reception mode for extracting exactly one channel according to this narrow-band, and the multi-channel mode may represent a wide-band reception mode for extracting at least two channels in the wide-band.

The multi-channel mode may be used for any multi-channel service. E.g., the multi-channel mode may be used for systems with channel bonding technology (e.g. DOCSIS3.0), or any multicarrier system using Orthogonal Frequency Division Multiplex (OFDM) or Discrete Multi-Tone (DMT) modulations.

In addition, the multi-channel mode may also be used for receiving simultaneously several single-channel services.

Accordingly, the device can be switched into the single-channel mode when a single-channel service is demanded, thereby saving power consumption, and the device can be switched into the multi-channel mode when a multi-channel service is demanded. Hence, the device can be used for different single- and multi-channel services, and it allows adapted power consumption depending on the used single-order multi-channel mode. Thus, current consumption in the single-channel mode is less than current consumption in the multi-channel mode.

In order to perform the single-channel reception and the multi-channel reception, the receiver unit may comprise frequency converting entities, filter entities and/or further signal processing entities. Thus, the outputted channel in the single-channel mode and the at least two outputted channels in the multi-channel mode may represent downconverted channels, wherein these downconverted channels may be converted from a radio frequency of the received signal to an intermediate frequency (IF). This IF may represent high-IF, low-IF or zero-IF.

The device may represent an integrated circuit (IC), or a System on a Chip (SoC). For instance, a RF receiving part of the apparatus and a demodulation part may be integrated on the same IC.

The receiver unit may be configured to provide an analog output signal for outputting the channel/channels, or it may be configured to provide a digital output signal for outputting the channel/channels.

Furthermore, the receiver unit may be associated with external components, e.g. with external surface acoustic wave (SAW) filters located either in RF, frequency conversion or IF. Thus, in case the receiver unit represents an IC, the external components are arranged external to the IC.

According to an embodiment of the present invention, the device comprises an output, wherein this output is configured to output the exactly one channel in the single-channel mode, and wherein this output is configured to output the at least two channels in the multi-channel mode.

I.e. this output may represent a shared output for both the single-channel mode and the multi-channel mode. Thus, the output may be considered to represent a narrow-band output in the single-channel mode and to represent a wide-band out put in the multi-channel mode. Accordingly, only one output is necessary for outputting the channel/channels.

For instance, in case the receiver unit comprises separate signal processing paths for the single-channel mode and the multi-channel mode, the receiver unit may comprise a switching entity configured to switch either the output of the single-channel mode's signal processing path our the output of the multi-channel mode's signal processing path to the shared output.

Furthermore, the output may be configured to provide an analog output signal, or it may be configured to provide a digital output signal.

According to an embodiment of the present invention, the device comprises a first output and a second output, wherein the first output is configured to output the exactly one channel in the single-channel mode, and the second output is configured to output the at least two channels in the multi-channel mode.

Thus, the first output is associated with the single-channel mode and the second output is associated with the multi-channel mode.

The first output may represent a narrow-band output, i.e. the bandwidth of the outputted signal comprising the exactly one channel at the first output is lower than the bandwidth of the outputted signal comprising the at least two channels outputted at the second output. Accordingly, the second output may represent a wideband output.

For instance, the second output may be configured to be switched off when the receiver unit is in the single-channel mode, and, vice versa, the first output may be configured to be switched off when the receiver unit is in the multi-channel mode.

According to an embodiment of the present invention, the receiver unit is configured to output a block of channels at the second output in the multi-channel mode, and wherein this block of channels is associated with a frequency bandwidth and comprises the at least two channels.

The second output is configured to output the at least two channels in form of a block of channels, i.e. the at least two channels are outputted via one output signal at the second output, wherein each of the at least two channels may be associated with a separate frequency signal having a predetermined bandwidth and separate carrier frequency in the frequency range of the frequency range of the outputted block of channels. The block of at least two channels is outputted on an output frequency, which may depend on down- or up-converting performed in the receiver unit. For instance, in case the received signal represents an RF signal, the output frequency may represent an IF frequency, i.e. the receiver unit may be configured to perform at least one down-conversion.

The exactly one channel outputted at the first output in the single-channel mode is associated with an output frequency, wherein this output frequency may correspond to the output frequency of the block of channels outputted at the second output.

Thus, the second output is configured to output a wideband signal comprising the at least two channels in the multi-channel mode, and the first output is configured to output a narrowband signal comprising the exactly one channel in the single-channel mode.

According to an embodiment of the present invention, the second output comprises at least two sub-outputs, and wherein each of the at least two sub-outputs is configured to output one of the at least two channels in the multi-channel mode.

Each of the at least two sub-output is configured to output exactly one channel of the at least two channels to be outputted in the multi-channel mode. I.e., independently channels of the received signal can be selected and outputted by means of the at least two sub-outputs of the second output. Accordingly, the at least two channels to be outputted in the multi-channel mode may be arranged at completely different frequency bands/positions in the received signal, i.e. they must not necessarily be arranged in an continuous frequency block.

Each of the at least two outputted channels is associated with an output frequency, wherein each of the output frequencies may depend on down- or up-converting performed in the receiver unit. For instance, in case the received signal represents an RF signal, the output frequencies may represent IF frequencies, i.e. the receiver unit may be configured to perform at least one down-conversion. For instance, each of the output frequencies of the signals outputted at the at least two sub-outputs may be the same.

According to an embodiment of the present invention, the device comprises a radio frequency entity configured to process the received signal, and comprising a frequency conversion entity configured to perform downscaling of the received signal to an intermediate frequency.

Thus, the received signal represents an RF signal.

The RF entity may comprise a receiver filter and other RF signal processing entities, and the frequency conversion entity may comprises at least one downscaling entity. For instance, at least one mixer may be used to perform this down-conversion.

The received RF signal may be downconverted to an intermediate frequency. For instance, extracting the at exactly one channel in the single-channel mode and extracting the at least two channels in the multi-channel mode may be performed based on this IF signal, e.g. by means of an IF entity. Thus, the outputted channel in the single-channel mode and the at least two outputted channels in the multi-channel mode may represent downconverted channels, wherein these downconverted channels are being converted from a radio frequency of the received signal to an intermediate frequency (IF). This IF may represent high-IF, low-IF or zero-IF.

According to an embodiment of the present invention, the device comprises a reconfigurable intermediate frequency entity, wherein the intermediate frequency entity is configured to output the exactly one channel from the converted received signal at intermediate frequency in the single-channel mode, and wherein the intermediate frequency entity is configured to output the at least two channels at intermediate frequency in the multi-channel mode.

This reconfigurable IF entity may represent a programmable IF section on an IC, but it may be realized in any other suited manner.

Thus, the reconfigurable IF entity may be fed with the downconverted IF signal received from the downconverting entity, and the reconfigurable IF entity can be switched into a narrowband mode for the single-channel mode and into a wide-band mode for the multi-channel mode. In the narrowband mode, the exactly one channel is outputted by means of the reconfigurable IF entity, and in the wideband-mode, the at least two channels are outputted by means of the reconfigurable IF entity. The narrowband-mode may allow power reduction compared to multi-channel mode, and, further, the reconfigurable IF entity may enable reduced chip area, as this IF entity is share for both the single-channel mode and the multi-channel mode.

According to an embodiment of the present invention, the device comprises a first signal path configured to perform single-channel reception for the single-channel mode, and comprising a second signal path configured to perform multi-channel reception for the multi-channel mode.

Thus, the first signal path is configured to extract the exactly channel in the single-channel mode, and the second signal path is configured to extract the at least two channels in the multi-channel mode.

Each of the first and second signal path may comprise a signal processing entity configured to extract the exactly channel in the single-channel mode and to extract the at least two channels in the multi-channel mode. For instance, this signal processing entity may operate in IF, wherein the device may comprise at least one RF entity and at least one down-converting entity in order to downconvert an received RF signal to IF.

For instance, the processing entity of the first signal path may comprise a bandpass filter and/or a low-pass filter or other filters for extracting the exactly one channel in the single-channel mode, and the processing entity of the second signal path may comprise a bandpass filter and/or a low-pass filter or other filters for extracting the exactly at least two channels in the multi-channel mode The extracted exactly one channel may be outputted either at a separate output or at the output of the multi-channel path.

For instance, each of the first and second signal paths may be configured to be switched on/off or may be configured to be switched in a standby mode. Thus, as an example, the second signal path may be switched off when the device is in the single-channel mode, and, vice versa, the first signal path may be switched off when the device is in the multi-channel mode. Current consumption of the first signal path in the single-channel mode is less than current consumption of the second signal in the multi-channel mode, as the exactly one channel to be extracted in the single-channel mode requires less bandwidth for signal processing than the bandwidth required for processing the at least two channels to be extracted in the second signal path. Thus, current consumption can be decreased in the single-channel mode when the second signal path is switched off or switched into standby.

Furthermore, as an example, both the first and second signal paths may be operated in parallel, so that exactly one channel can be outputted by the first signal path and simultaneously at least two channels can be outputted by the second signal path. Thus, a single-channel service and a further multi-channel service may be used in parallel.

Without any restrictions, it is now assumed that the received signal represents an RF signal.

According to an embodiment of the present invention, the device comprises a shared radio frequency entity located in front of the first and second signal path, wherein both the first signal path and the second signal path share this shared radio frequency entity.

The shared RF entity allows reduced implementation complexity. Thus, in case the device represents an IC, the silicon area can be reduced and, thus, costs are decreased.

For instance, the shared RF entity may be designed to be reconfigurable, so that the RF entity can be configured/programmed depending on the RF requirements for each possible mode, e.g. for the RF requirement of the single-channel mode and for the RF requirements of the multi-channel mode.

According to an embodiment of the present invention, the at least one of the first and the second signal path comprises a radio frequency entity.

For instance, the RF entity of the first signal path is configured to process the received RF signal with respect to the exactly one channel to be extracted from the received signal, and the RF entity of the second signal path is configured to process the received RF signal with respect to the at least two channels to be extracted. These RF entities of the first and second signal path may comprise different kind of filters (low-pass, high-pass, band-pass filters). Thus, the RF entity of the first signal path can be optimized for single-channel reception and the RF entity of the second signal path can be optimized for multi-channel reception.

According to an embodiment of the present invention, the device comprises a shared frequency conversion entity between the shared radio frequency entity and the first and the second signal path.

The shared frequency conversion entity may be designed to be reconfigurable, so that the frequency conversion performed by the conversion entity can be adapted in dependency on the applied mode.

The shared frequency conversion entity may be configured to down-convert the received RF signal to IF, so that this IF signal can be processed in order to extract the exactly one channel in the single-channel mode and/or the at least two channels in the multi-channel mode.

According to an embodiment of the present invention, at least one of the first and the second signal path comprises a frequency conversion entity. The frequency conversion entity can be built from one or several up/down conversion sub-stages.

For instance, each of the at least one first and second path comprises an own frequency conversion entity.

For instance, each of the frequency conversion entity in the first and second signal path may comprise at least one frequency mixer in order to perform the down-conversion. Thus, each of the frequency conversion entities outputs the down-converted signal at an output frequency in the IF range, wherein the IF output frequency may be high-IF or low-IF or zero IF.

According to an embodiment of the present invention, each of the first and the second signal path comprises an intermediate frequency entity, wherein the intermediate frequency entity in the first signal path is configured to output the exactly one channel from the converted received signal at intermediate frequency in the single-channel mode, and wherein the intermediate frequency entity in the second signal path is configured to output the at least two channels from the converted received signal at intermediate frequency in the multi-channel mode.

The IF entity in the first signal path may be configured to extract the exactly one channel from the downconverted signal. It has to be noted, that extracting the exactly one channel from the received signal may also be performed in conjunction with an RF entity located in the first signal path.

For instance, a bandpass filter and/or a low-pass filter may be used for extracting the exactly one channel in the single-channel mode. The extracted exactly one channel may be outputted either at a separate output or at the output of the multi-channel path.

The IF entity of the second signal path may be configured to extract the at least two channels from the downconverted signal. It has to be noted, that extracting the exactly one channel from the received signal may also be performed in conjunction with an RF entity located in the second signal path.

For instance, at least one bandpass filter and/or a low-pass filters may be used for extracting the at least two channels in the multi-channel mode.

According to an embodiment of the present invention, the second signal path is configured to be switched in a standby-mode for saving power, and wherein the second signal path is switched into the standby-mode when the device is in the single-channel mode.

Thus, power consumption reduction can be achieved, as the wideband-processing second signal path is switched into the standby-mode, when the device is in the single-channel mode and no multi-channel mode is used.

According to an embodiment of the present invention, the first signal path is configured to be switched in a standby-mode for saving power, and wherein the first signal path is switched into the standby-mode when the device is in the multi-channel mode.

Thus, power consumption can be achieved, as the first signal path is switched into standby, when the single-channel mode is not used.

According to an embodiment of the present invention, the device represents an integrated circuit.

For instance, the device may represent a System on a Chip (SoC). For instance, a RF receiving part of the apparatus and a demodulation part may be integrated on the same IC.

These and other aspects of the invention will be apparent from and elucidated with reference to the embodiments described hereinafter.

DETAILED DESCRIPTION OF THE DRAWINGS

In the following detailed description, exemplary embodiments will be described.

Figure 2A:
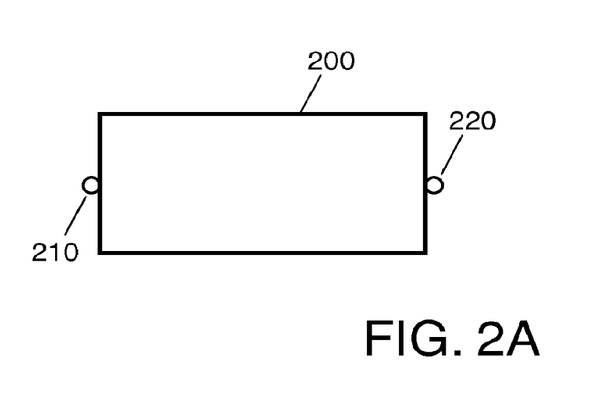
FIG. 2a a schematic block diagram of a first exemplary embodiment of an device according to the present invention.

FIG. 2a depicts a schematic block diagram of a first exemplary embodiment of a device 200 according to the present invention. This device 200 will be described in combination with the schematic flowchart of an exemplary embodiment of a method according to the present invention depicted in FIG. 4.

Device 200 represents a receiver unit 200 which is configured to receive a signal at input 210. For instance, this received signal may represent a radio frequency (RF) signal, wherein this RF signal may be received by means of an antenna (not depicted in FIG. 2a), or it may be received by means of a cable (not depicted in FIG. 2a). It has to be noted, that the received signal is not limited to RF signals.

The receiver unit 200 can be operated in a single-channel mode and in a multi-channel mode.

Figure 2B:
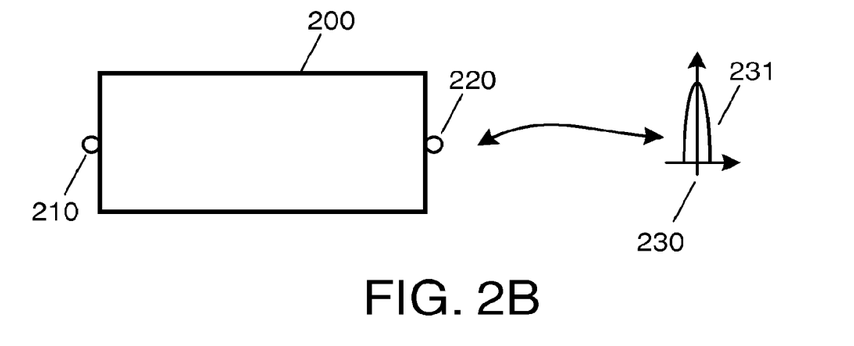
FIG. 2b a schematic block diagram of the first exemplary embodiment of the device in an exemplary single-channel mode.

In the single-channel mode the receiver unit 200 is configured to output exactly one channel of the received signal at output 220. Thus, in the single-channel mode the receiver unit 200 performs single-channel reception in order to extract a desired channel 231 from the received signal. FIG. 2b depicts the receiver unit 200 being operated in the single-channel mode, i.e. exactly one channel 231 of the received signal is outputted at output 220. This channel 231 may be associated with a signal having a predetermined bandwidth on a single carrier in the frequency spectrum. Of course, the received signal may comprise further channels on different carriers, but in the single-channel mode only the desired channel is extracted.

Figure 2C:
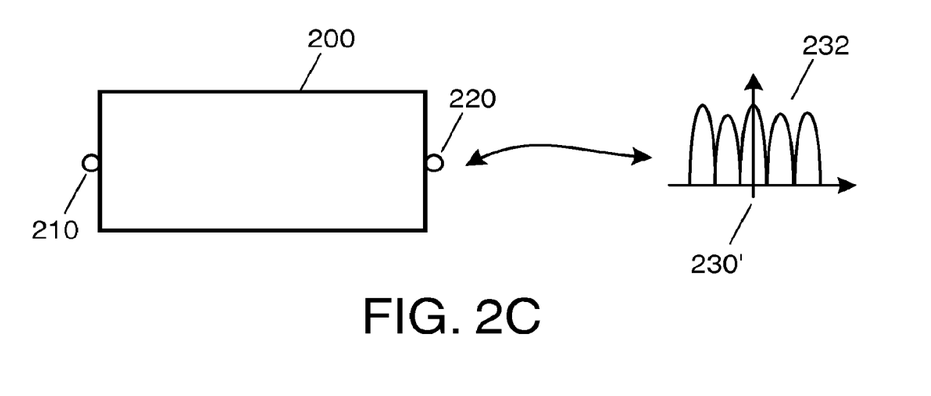
FIG. 2c a schematic block diagram of the first exemplary embodiment of the device in an exemplary multi-channel mode.

In the multi-channel mode the receiver unit 200 is configured to output at least two channels of the received signal at output 220. Thus, in the multi-channel mode the receiver unit 200 performs multi-channel reception in order to extract the at least two channels of the received signals. FIG. 2c depicts the receiver unit 200 being operated in the multi-channel mode, i.e. at least two channels 232 of the received signal are outputted at output 220. Each of these at least two channels 232 may be associated with a separate signal having a predetermined bandwidth on a separate carrier in the frequency spectrum. For instance, at least two of the least two channels 232 may be associated with one communication service, i.e. this communication service uses at least two separate frequency channels. Thus, in order to use this communication service, the receiver unit 200 can be operated in the multi-channel mode.

Figure 4:
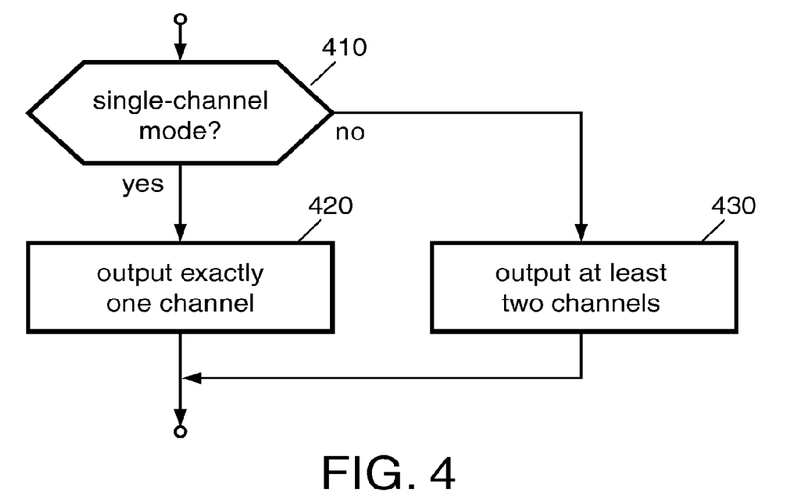
FIG. 4 a schematic flowchart of an exemplary embodiment of a method according to the present invention.

With respect to the exemplary method depicted in FIG. 4, it may be determined whether the single-channel mode should be used or not (step 410), and in case the single-channel mode is selected, exactly one channel 231 of the received signal is outputted (step 420) in accordance with the single-channel mode and as exemplarily depicted in FIG. 2b. In case no single-channel mode is selected, at least two channels 232 of the received signal are outputted (step 430) in accordance with the multi-channel mode, as exemplarily depicted in FIG. 2c.

Thus, the apparatus 100 can be driven in the single-channel mode when only one channel has to be extracted from the received channel. For instance, this single-channel mode may be used for any single-channel service. This single-channel mode may allow low-power consumption compared to the multi-channel mode, as the signal-processing for extracting the exactly one channel is less complex than the signal processing for extracting the at least two channels in the multi-channel mode. For instance, the bandwidth of the exactly one channel in the single-channel mode is less then the bandwidth for processing the at least two channels in the multi-channel mode. Thus, as an example, the single-channel mode may represent a narrow-band reception mode for extracting exactly one channel in this narrow-band, and the multi-channel mode may represent a wide-band reception mode for extracting at least two channels in the wide-band.

The multi-channel mode may be used for any multi-channel service. E.g., the multi-channel mode may be used for any multicarrier system like Orthogonal Frequency Division Multiplex (OFDM), DOCSIS systems using bonded channel technology (e.g. DOCSIS 3.0), or any other multi-channel system.

Accordingly, the apparatus 200 can be switched into the single-channel mode when a single-channel service is demanded, thereby saving power consumption, and the apparatus 200 can be switched into the multi-channel mode when a multi-channel service is demanded. Hence, the apparatus 200 can be used for different single- and multi-channel services, and it allows adapted power consumption depending on the used single- or multi-channel mode. Thus, current consumption in the single-channel mode is less than current consumption in the multi-channel mode.

In order to perform the single-channel reception and the multi-channel reception, the receiver unit may comprise frequency converting entities (built from one or several up/down conversion sub-stages), filter entities and/or further signal processing entities. Thus, the outputted channel in the single-channel mode and the at least two outputted channels in the multi-channel mode may represent downconverted channels, wherein these downconverted channels may be converted from radio frequency of the received signal to an intermediate frequency (IF), exemplarily indicated by reference signs 230 and 230' in FIGS. 2b and 2c. This IF may represent high-IF, low-IF or zero-IF.

The output 220 of apparatus 200 is configured to output the exactly one channel in the single-channel mode and configured to output the at least two channels in the multi-channel mode, i.e. the output 220 represents a shared output 220. Thus, the output 220 may be considered to represent a narrow-band output in the single-channel mode and to represent a wide-band out put in the multi-channel mode. Furthermore, the output 220 may be configured to provide an analog output signal, or it may be configured to provide a digital output signal.

The apparatus 200 may represent an integrated circuit (IC), or a System on a Chip (SoC). For instance, a RF receiving part of the apparatus 200 and a demodulation part may be integrated on the same IC.

Furthermore, the receiver unit 200 may be associated with external components, e.g. with external surface acoustic wave (SAW) filters located either in RF, frequency conversion or IF. Thus, in case the receiver unit 200 represents an IC, the external components are arranged external to the IC.

Figure 3A:
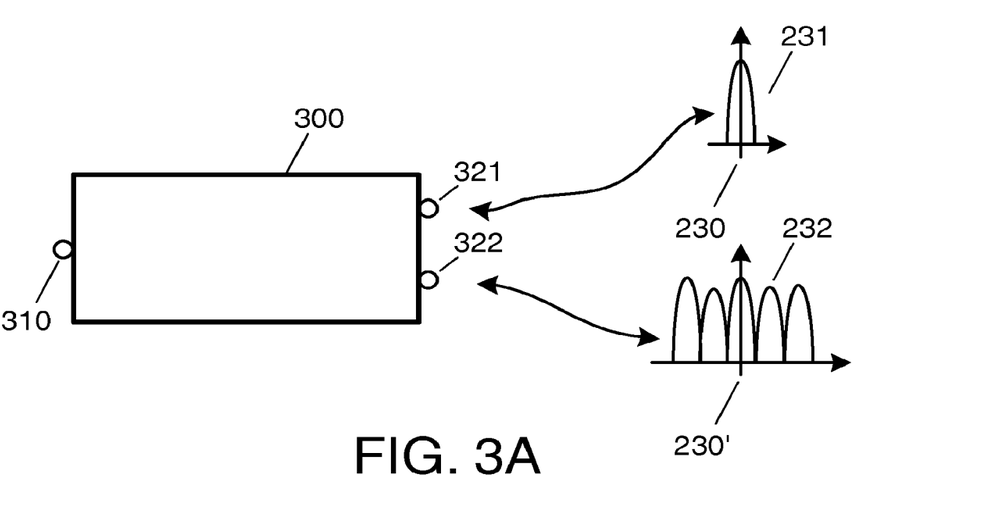
FIG. 3a a schematic block diagram of a second exemplary embodiment of an device according to the present invention.

FIG. 3a depicts a schematic block diagram of a second exemplary embodiment of a device 300 according to the present invention. This device 300 is substantially based on the device 200 depicted in FIG. 3a, except for the different outputs 321 and 322, i.e. device 300 represents a receiver unit 300 which can be operated in the single-channel mode and in the multi-channel mode. Accordingly, the explanations and advantages presented with respect to the first exemplary embodiment also hold for the second exemplary embodiment depicted in FIG. 3a.

The receiver unit 300 comprises a first output 321 associated with the single-channel mode, i.e. the first output 321 is configured to output the exactly one channel 231 of the received signal when the receiver unit 300 is in the single-channel mode.

The receiver unit 300 further comprise a second output 322 associated with the multi-channel mode, i.e. the second output 322 is configured to output the at least two channels 232 of the received signal when the receiver unit 330 is in the multi-channel mode. The second output 322 is configured to output the at least two channels 232 in form of a block of channels, i.e. the at least two channels 232 are outputted via one output signal at the second output 322, wherein each of the at least two channels may be associated with a separate frequency signal having a predetermined bandwidth and separate carrier frequency in the frequency range. The block of at least two channels 232 is outputted at an output frequency 230', which may depend on down- or up-converting performed in the receiver unit 300, as explained with respect to the first exemplary embodiment. For instance, in case the signal received at input 310 represents an RF signal, the output frequency 230' may represent an IF frequency, i.e. the receiver unit 300 may be configured to perform at least one down-converting.

Similarly, the exactly one channel outputted at the first output 321 in the single-channel mode is associated with an output frequency 230, wherein this output frequency may correspond to the output frequency 230' of the block of channels 232.

The first output 321 may represent a narrow-band output, i.e. the bandwidth of the outputted signal at the first output 321 is lower than the bandwidth of the outputted signal outputted at the second output 322. Accordingly, the second output 322 may represent a wideband output.

For instance, the second output 322 can be switched off when the receiver unit 300 is in the single-channel mode, and, vice versa, the first output 321 can be switched off when the receiver unit 300 is in the multi-channel mode.

Figure 3B:
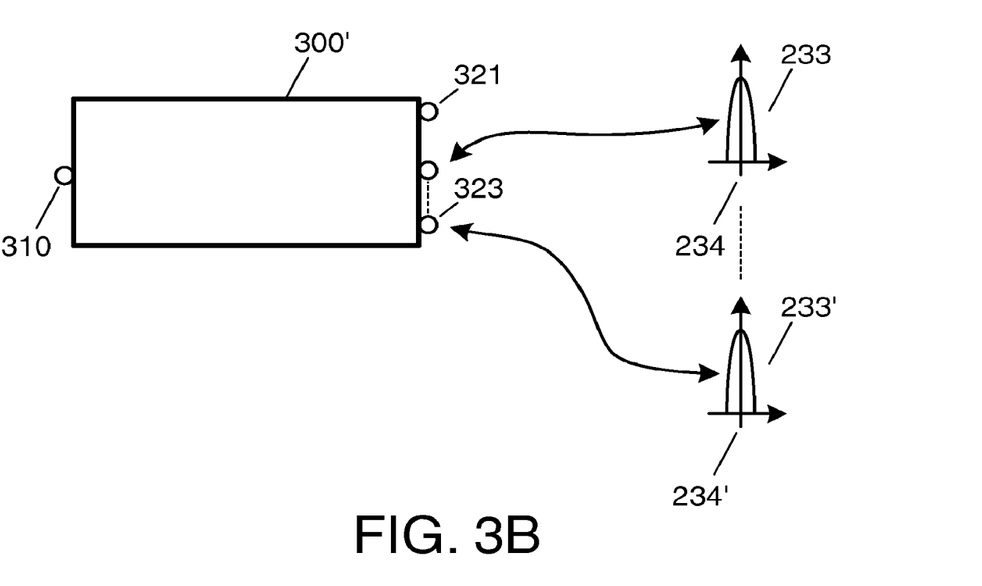
FIG. 3b a schematic block diagram of a third exemplary embodiment of an device according to the present invention.

FIG. 3b depicts a schematic block diagram of a third exemplary embodiment of a device 300' according to the present invention. This device 300' is substantially based on the devices 200 and 300' depicted in FIG. 3b, except for the different output 323. Accordingly, the explanations and advantages presented with respect to the preceding exemplary embodiments also hold for the third exemplary embodiment depicted in FIG. 3b.

The first output 321 of the receiver unit 300' represents the output associated with the single-channel mode and corresponds to the first output 321 of the receiver unit 300.

The second output 323 of the receiver unit 300' is associated with the multi-channel mode and comprises at least two sub-outputs. Each of the at least two sub-output is configured to output exactly one channel of the at least two channels 233, 233' to be outputted in the multi-channel mode. I.e., independently channels of the received signal can be selected and outputted by means of the at least two sub-output of the second output 323. Accordingly, the at least two channels to be outputted in the multi-channel mode may be arranged at completely different frequency bands/positions in the received signal, i.e. they must not necessarily be arranged in an continuously frequency block. Each of the at least two outputted channels 233, 233' is associated with an output frequency 234, 234'.

Each of the output frequencies 234, 234' may depend on down- or up-converting performed in the receiver unit 300', as explained with respect to the preceding exemplary embodiments. For instance, in case the signal received at input 310 represents an RF signal, the output frequencies 234, 234' may represent IF frequencies, i.e. the receiver unit 300' may be configured to perform at least one down-converting. For instance, each of the output frequencies 234, 234' may be the same.

The following exemplary embodiments depicted in FIGS. 5a, 5b, 6a and 6b are based on the preceding exemplary embodiments mentioned above. Thus, the explanations and advantages presented with respect to the preceding exemplary embodiments also hold for the succeeding embodiments. It has to be noted, that any of the devices 500, 500', 600 and 600' can be provided with a commonly shared output for outputting the exactly one channel in the single-channel mode and for outputting the at least two channels in the multi-channel mode as described with respect to the device 200 depicted in FIGS. 2b and 2c, but any of the of the devices 500, 500', 600 and 600' may also be provided with separate outputs for the single-channel mode and the multi-channel mode, respectively, e.g. as explained with respect to device 300 in FIG. 3a or with respect to device 300' in FIG. 3b.

Figure 5A:
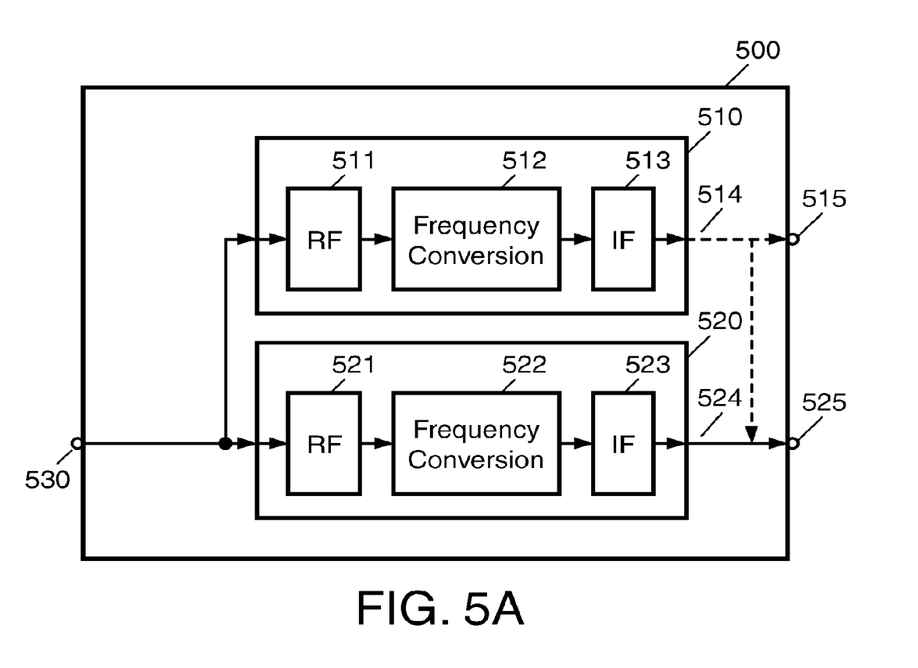
FIG. 5a a schematic block diagram of a fourth exemplary embodiment of an device according to the present invention.

FIG. 5a depicts a fourth exemplary embodiment of a device 500 according to the present invention.

The device 500 comprises a first signal path 510 configured to perform single channel reception for the single-channel mode, and the device 500' comprises a second signal path 520 configured to perform multi-channel for the multi-channel mode. The device 500' further comprises an input 530 in order to receive an input signal and to feed this input signal to the first signal path 510 and to the second signal path 520, respectively. This input 530 may correspond to the inputs 210 and 310 of the preceding exemplary embodiments, and the input 530 is configured to receive an RF signal.

Each of the first and second signal paths 510, 520 in FIG. 5a comprises a RF entity 511, 521 in order to perform RF signal processing. For instance, the RF entity 511 of the first signal path 510 is configured to process the received RF signal with respect to the exactly one channel to be extracted from the received signal, and the RF entity 521 of the second signal path 520 is configured to process the received RF signal with respect to the at least two channels to be extracted. These RF entities 511, 521 may comprise receive filters and/or further filters, e.g. bandpass filters. Thus, the RF entity 511 can be optimized for single-channel reception and the RF entity 521 can be optimized for multi-channel reception.

Furthermore, each of the first and signal paths 510, 520 comprises a frequency conversion entity 512, 522 in order to downconvert the RF signal outputted from the respective RF entity 511, 521. For instance, each of the frequency conversion entity 512, 522 may comprise at least one frequency mixer in order to perform the downconverting. Thus, each of the frequency conversion entities 512, 522 outputs the downconverted signal at an output frequency in the IF range, wherein the IF output frequency may be high-IF or low-IF or zero IF.

In the first signal path 510, the downconverted signal is processed by means of an IF entity 513, wherein the IF entity 513 may be configured to extract the exactly one channel from the downconverted signal. It has to be noted, that extracting the exactly one channel from the received signal may also be performed by means of the RF entity 511. For instance, a bandpass filter and/or a low-pass filter may be used for extracting the exactly one channel in the single-channel mode. The extracted exactly one channel may be outputted either at a separate output 515 or at the output 525 of the multi-channel path 520. The device 500 may comprise further entities (not depicted in FIG. 5a) in order to perform outputting the extracted channel/channels, e.g. switching entities configured to the output of a signal path 510, 520 to a desired output 515, 525.

Furthermore, with respect to the second signal path 520 associated with the multi-channel mode, the downconverted signal is processed by means of an IF entity 523, wherein the IF entity 523 may be configured to extract the at least two channels from the downconverted signal.

For instance, each of the first and second signal paths 510, 520 may be configured to be switched on/off or may be configured to be switched in a standby mode. Thus, as an example, the second signal path 520 may be switched off when the device 500 is in the single-channel mode, and, vice versa, the first signal path 510 may be switched off when the device 500 is in the multi-channel mode. Current consumption of the first signal path 510 in the single-channel mode is less than current consumption of the second signal 520 in the multi-channel mode, as the exactly one channel to be extracted in the single-channel mode requires less bandwidth for signal processing than the bandwidth required for processing the at least two channels to be extracted in the second signal path 520. Thus, current consumption can be decreased in the single-channel mode when the second signal path 520 is switched off or switched into standby.

Furthermore, as an example, both the first and second signal paths 510, 520 may be operated in parallel, so that exactly one channel can be outputted by the first signal path 510 and simultaneously at least two channels can be outputted by the second signal path 520. Thus, a single-channel service and a further multi-channel service may be used in parallel.

Figure 5B:
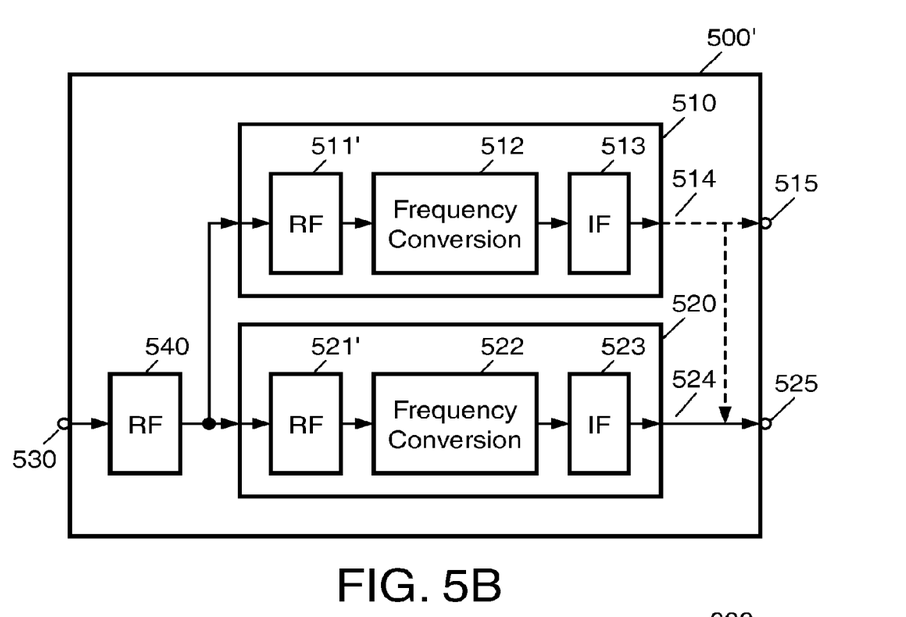
FIG. 5b a schematic block diagram of a fifth exemplary embodiment of an device according to the present invention.

FIG. 5b depicts a fifth exemplary embodiment of a device 500' according to the present invention, wherein this device 500' is substantially based on the device 500 depicted in FIG. 5a.

In contrast to the fourth exemplary embodiment, the device 500' comprises a shared RF entity 540, wherein this shared RF entity 540 is configured to perform RF signal processing for both the single-channel mode and the multi-channel mode. Furthermore, the RF entities 511' and 521' of the first and second signals paths 510, 520 are adapted to perform the RF signal processing with respect to the output signal from the shared RF entity 540.

For instance, the shared RF entity 540 may be configured to be reconfigurable, so that the RF 540 entity can be configured/programmed depending on the RF requirements for each possible mode, e.g. for the RF requirements of the single-channel mode and for the RF requirements of the multi-channel mode.

The shared RF entity 540 allows reduced implementation complexity. Thus, in case the device 500' represents an IC, the silicon area can be reduced and, thus, costs are decreased.

Figure 6A:
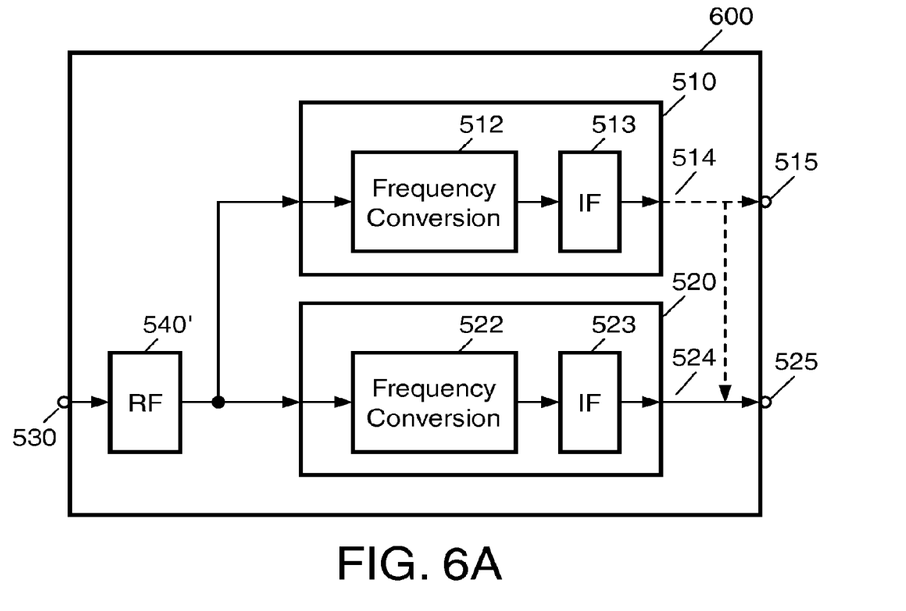
FIG. 6a a schematic block diagram of a sixth exemplary embodiment of an device according to the present invention.

FIG. 6a depicts a sixth exemplary embodiment of a device 600 according to the present invention, wherein this device 600 is substantially based on the device 500' depicted in FIG. 5b.

Compared the fifth exemplary embodiment, each of the first and second signal paths 510, 520 does not comprise an own RF entity, so that only shared RF entity 540' is used for both the first and second signal path 510, 520. As mentioned above, the RF entity 540' may be configured to be reconfigurable, so that the RF entity can be configured/programmed depending on the RF requirements for each possible mode.

Figure 6B:
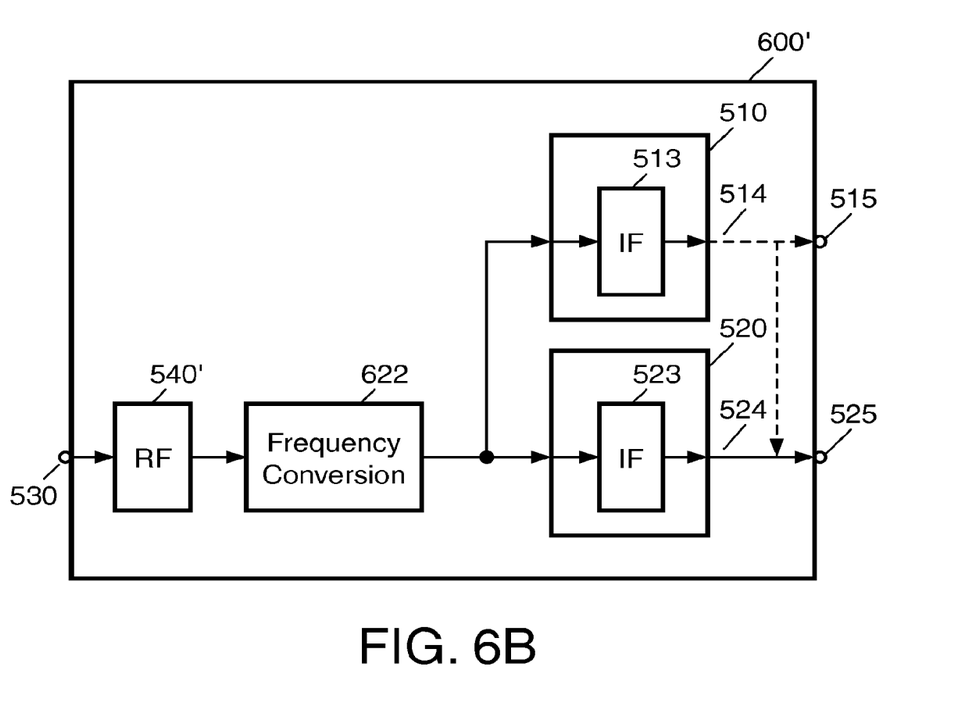
FIG. 6b a schematic block diagram of a seventh exemplary embodiment of an device according to the present invention.

FIG. 6b depicts a seventh exemplary embodiment of a device 600' according to the present invention, wherein this device 600' is substantially based on the device 600 depicted in FIG. 6a.

In this seventh exemplary embodiment, a shared frequency conversion entity 622 is used for both the first signal path 510 and the second signal path 520. The shared frequency conversion entity 622 may be configured to be reconfigurable, so that the frequency conversion performed by the conversion entity 622 can be adapted in dependency on the applied mode.

The invention has been described above by means of exemplary embodiments. It should be noted that there are alternative ways and variations which are obvious to a skilled person in the art and can be implemented without deviating from the scope and spirit of the appended claims. In particular, the present invention is not limited to DOCSIS system, but may be applied to any other communication system.

The invention claimed is:

1. A device comprising:
a receiver unit configured to operate in a single-channel mode and in a multi-channel mode, wherein in the single-channel mode the receiver unit is configured to output exactly one channel of a received signal, and in the multi-channel mode the receiver unit is configured to output at least two channels of the received signal;
a first output connector configured to output the exactly one channel in the single-channel mode;
a second output connector configured to output the at least two channels in the multi-channel mode;
a radio frequency entity configured to process the received signal, and comprising a frequency conversion entity configured to perform down-conversion of the received signal to an intermediate frequency; and
a reconfigurable intermediate frequency entity,
wherein the intermediate frequency entity is configured to output the exactly one channel from the converted received signal at intermediate frequency in the single-channel mode, and wherein the intermediate frequency entity is configured to output the at least two channels at intermediate frequency in the multi-channel mode, and
wherein the first output connector and the second output connector are different from each other.

2. The device according to claim 1, wherein the receiver unit is configured to output a block of channels at the second output connector in the multi-channel mode, and wherein this block of channels is associated with a frequency bandwidth and comprises the at least two channels.

3. The device according to claim 1, wherein the second output connector comprises at least two sub-output connectors, and wherein each of the at least two sub-output connectors is configured to output one of the at least two channels in the multi-channel mode.

4. A device, comprising:
a receiver unit configured to operate in a single-channel mode and in a multi-channel mode, wherein in the single-channel mode the receiver unit is configured to output exactly one channel of a received signal, and in the multi-channel mode the receiver unit is configured to output at least two channels of the received signal;
a first signal path configured to perform single-channel reception for the single-channel mode;
a second signal path configured to perform multi-channel reception for the multi-channel mode;
a shared radio frequency entity located in front of the first and second signal paths wherein both the first signal path and the second signal path share this shared radio frequency entity; and
a shared reconfigurable frequency conversion entity between the shared radio frequency entity and the first and the second signal paths,
wherein the first signal path and the second signal path are different from each other.

5. The device according to claim 4, wherein the second signal path is configured to be switched in a standby-mode for saving power, and wherein the second signal path is switched into the standby-mode when the device is in the single-channel mode.

6. The device according to claim 4, wherein the first signal path is configured to be switched in a standby-mode for saving power, and wherein the first signal path is switched into the standby-mode when the device is in the multi-channel mode.

7. The device according to claim 1, wherein the device represents an integrated circuit.

8. A method of operating a receiver unit, comprising:
providing a shared radio frequency entity located in front of a first signal path and a second signal path, wherein both the first signal path and the second signal path share this shared radio frequency entity;
providing a shared reconfigurable frequency conversion entity between the shared radio frequency entity and the first and the second signal paths,
determining whether the receiver unit is to be operated in a single-channel mode, wherein the receiver unit is configured to operate in the single-channel mode and in a multi-channel mode;
reconfiguring the frequency conversion entity according to a result of the determining step;
outputting, through the first signal path configured to perform single-channel reception for the single-channel mode, exactly one channel of a received signal at the receiver unit when the receiver unit is operated in the single-channel mode; and
outputting, through the second signal path configured to perform multi-channel reception for the multi-channel mode, at least two channels of the received signal at the receiver unit when the receiver unit is operated in the multi-channel mode,
wherein the first signal path and the second signal path are different from each other.

9. A non-transitory computer-readable storage medium containing instructions that, when the non-transitory computer-readable storage medium is used by a computer, cause the computer to perform the steps of:
determining whether a receiver unit is to be operated in a single-channel mode, wherein the receiver unit is configured to operate in the single-channel mode and in a multi-channel mode, the receiver unit including a shared radio frequency entity located in front of a first signal path and a second signal path, wherein both the first signal path and the second signal path share this shared radio frequency entity, and a shared reconfigurable frequency conversion entity between the shared radio frequency entity and the first and the second signal paths;
reconfiguring the frequency conversion entity according to a result of the determining step;
outputting, through a first signal path configured to perform single-channel reception for the single-channel mode, exactly one channel of a received signal at the receiver unit when the receiver unit is operated in the single-channel mode; and
outputting, through a second signal path configured to perform multi-channel reception for the multi-channel mode, at least two channels of the received signal at the receiver unit when the receiver unit is operated in the multi-channel mode,
wherein the first signal path and the second signal path are different from each other.

10. A system, comprising:
a device according to claim 1, and
a controller unit configured to switch the device into the single-channel mode and into the multi-channel mode.

11. The device according to claim 4, wherein the first signal path includes a first output, and the second signal path includes a second output.

* * * * *